United States Patent [19]

Hayes et al.

[11] Patent Number: 5,063,263

[45] Date of Patent: * Nov. 5, 1991

[54] POLYACETAL COMPOSITIONS CONTAINING A NON-MELTABLE POLYMER STABILIZER IMPROVED WITH A MINOR AMOUNT OF AT LEAST ONE MELTABLE CO-STABILIZER AND AT LEAST ONE PRIMARY ANTIOXIDANT

[75] Inventors: Richard A. Hayes, Parkersburg; Leonard E. R. Kosinski, Washington, both of W. Va.; Mark E. Wagman, Wilmington, Del.

[73] Assignee: E. I. du Pont de Nemours and Company, Wilmington, Del.

[*] Notice: The portion of the term of this patent subsequent to Nov. 20, 2007 has been disclaimed.

[21] Appl. No.: 536,343

[22] Filed: Jun. 11, 1990

Related U.S. Application Data

[63] Continuation-in-part of Ser. No. 366,558, Jun. 15, 1989, abandoned.

[51] Int. Cl.$^5$ .............................................. C08K 00/00
[52] U.S. Cl. ................................... 524/101; 524/219; 524/221; 524/255; 524/291
[58] Field of Search ............... 524/291, 221, 219, 101, 524/255

[56] References Cited

U.S. PATENT DOCUMENTS

| | | |
|---|---|---|
| 3,204,014 | 8/1965 | Green . |
| 3,210,322 | 10/1965 | Polly . |
| 3,215,671 | 11/1965 | Melby . |
| 3,219,727 | 11/1965 | Kray . |
| 3,235,531 | 2/1966 | Walker . |
| 3,236,929 | 2/1966 | Jupa . |
| 3,281,499 | 10/1966 | Dolce . |
| 3,338,872 | 8/1967 | Kiss et al. . |
| 3,366,561 | 1/1968 | Marans . |
| 3,418,280 | 12/1968 | Orgen . |
| 3,470,135 | 9/1969 | Ishida . |
| 3,518,326 | 6/1970 | Forsberg . |
| 4,098,843 | 7/1978 | Johnson . |
| 4,230,606 | 10/1980 | Amann et al. . |
| 4,464,435 | 8/1984 | Hattori . |
| 4,522,735 | 6/1985 | Chasar . |
| 4,555,357 | 11/1985 | Kausga et al. . |
| 4,596,847 | 6/1990 | Kasuga et al. ....................... 524/220 |
| 4,640,949 | 2/1987 | Wagman . |
| 4,657,970 | 4/1987 | Shiraki et al. . |
| 4,657,971 | 4/1987 | Shiraki et al. . |
| 4,766,168 | 8/1988 | West . |
| 4,814,397 | 3/1989 | Novak . |
| 4,972,014 | 11/1990 | Hayes et al. ......................... 524/219 |

Primary Examiner—Veronica P. Hoke

[57] ABSTRACT

Incorporation into polyacetal molding compositions stabilized for processing with a non-meltable polymer stabilizer of 0.01–1.00 weight percent of at least one meltable co-stabilizer, said co-stabilizer being a thermal stabilizer for polyacetal, and 0.02–1.0 weight percent of at least one primary antioxidant results in significantly improved long term stability, as evidenced by greater retention of physical properties over time, of such compositions.

19 Claims, No Drawings

POLYACETAL COMPOSITIONS CONTAINING A NON-MELTABLE POLYMER STABILIZER IMPROVED WITH A MINOR AMOUNT OF AT LEAST ONE MELTABLE CO-STABILIZER AND AT LEAST ONE PRIMARY ANTIOXIDANT

CROSS REFERENCE TO RELATED APPLICATION

This is a continuation-in-part of U.S. patent application Ser. No. 07/366,558, filed June 15, 1989 now abandoned.

BACKGROUND

Technical Field

This invention relates to improving the long term stability, or retention of physical properties, of polyacetal compositions containing a non-meltable polymer stabilizer. Specifically, the overall long term stability of polyacetal compositions containing a non-meltable polymer stabilizer is found to be significantly improved when there is incorporated into the composition a minor amount of at least one meltable co-stabilizer, along with at least one primary antioxidant.

Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Polyacetal compositions containing a non-meltable polymer stabilizer possess excellent stability during processing. Compositions based on polyacetals of relatively high number average molecular weight, e.g., 10,000 to 100,000, which contain a non-meltable polymer stabilizer, are useful in preparing semi-finished and finished articles by any of the techniques commonly used with thermoplastic materials, e.g., compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, the physical properties of the polyacetal composition containing the non-meltable polymer stabilizer may decrease with time, even when there is present an antioxidant. It is therefore an object of the present invention to improve upon the long term stability (i.e., improve upon the long term retention of physical properties) of a polyacetal composition containing at least one non-meltable polymer stabilizer. Such an improvement is achieved through the incorporation into the polyacetal composition of a minor amount of at least one meltable co-stabilizer, said co-stabilizer being a thermal stabilizer for polyacetal, and at least one primary antioxidant.

The compositions of the present invention are useful wherever enhanced stability, both during and after processing, are desired.

SUMMARY OF THE INVENTION

This invention relates to certain polyacetal compositions containing a non-meltable polymer stabilizer, for processing stability, that are characterized as having improved long term stability. Specifically, the compositions of the present invention consist essentially of (a) 0.05-3.0 weight percent of a non-meltable polymer stabilizer, (b) 0.01-1.00 weight percent of at least one meltable co-stabilizer, (c) 0.02-1.0 weight percent of at least one phenolic antioxidant, and (d) 95-99.9 weight percent of a polyacetal, said weight percents being based upon the total of components (a)-(d).

The non-meltable polymer stabilizer contains formaldehyde reactive hydroxyl groups and/or formaldehyde reactive nitrogen groups, has a number average particle size, in the polyacetal, of less than ten microns, is non-meltable, and is used to increase the processing stability of polyacetal.

The co-stabilizer is a meltable thermal stabilizer for polyacetal. The primary antioxidant is known in the art. The meltable co-stabilizer and the primary antioxidant are used not to provide increased stability during processing but rather, to provide increased stability over time upon exposure to air. The presence of both the meltable co-stabilizer and the primary antioxidant in the polyacetal composition results in a significant improvement in the long term, aerobic stability of the polyacetal composition. The long term stability of the polyacetal composition is also improved when there is added a mixture of meltable co-stabilizers and a mixture of primary antioxidants.

DETAILED DESCRIPTION OF THE INVENTION

This invention relates to improving the long term stability of polyacetal compositions containing a non-meltable polymer stabilizer. Polyacetal compositions containing a non-meltable polymer stabilizer have been found to possess excellent processing stability. While these compositions exhibit excellent processing stability, they may lose some physical properties after exposure to air over time. Despite the property loss that may occur with time, it is still desirous to use these non-meltable polymer stabilized polyacetal compositions because of the excellent processing stability that the compositions possess. Therefore, it is desirous to find a means by which the long term stability of these compositions can be improved.

In the present invention, it has been found that the long term stability of polyacetal compositions containing a non-meltable polymer stabilizer can be improved with the addition to the composition of at least one primary antioxidant and a minor amount of at least one meltable co-stabilizer for polyacetal.

The polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 Å. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

The non-meltable polymer stabilizer

The non-meltable polymer stabilizer used to provide improved processing stability in the compositions of the present invention is a homopolymer or copolymer containing formaldehyde reactive nitrogen groups, formaldehyde reactive hydroxyl groups, or both formaldehyde reactive nitrogen and formaldehyde reactive hydroxyl groups. By "formaldehyde reactive" it is meant that the hydroxyl group contains an oxygen with a hydrogen atom bonded to it and the nitrogen group contains a nitrogen with one or two hydrogen atoms bonded to it. Formaldehyde will react with the —OH or the —NH bonds of the stabilizer polymer. These reactive sites are referred to herein as formaldehyde reactive sites. It is preferred that the non-meltable polymer stabilizer contain formaldehyde reactive nitrogen or hydroxyl groups having the maximum number of formaldehyde reactive sites. For example, a non-meltable polymer stabilizer containing formaldehyde reactive nitrogen groups wherein there are two hydrogen atoms attached directly to the nitrogen atom (i.e., two formaldehyde reactive sites in the group) is preferred over one containing formaldehyde reactive nitrogen groups wherein there is only one hydrogen atom attached directly to the nitrogen atom (i.e., one formaldehyde reactive site in the group).

The non-meltable polymer stabilizer has at least ten repeat units. It preferably has a weight average molecular weight of greater than 5,000, most preferably greater than 10,000. Higher weight average molecular weights are most preferred and further, such higher weight average molecular weights may be advantageous for reducing mold deposit formation.

The non-meltable polymer stabilizer is non-meltable at the temperature at which the polyacetal is melt processed. By the term "non-meltable", it is meant that the non-meltable polymer stabilizer has its "major melting point" above the temperature at which the polyacetal is melt processed and thus remains essentially a solid during melt processing of the polyacetal. Alternatively, a polymer stabilizer is "non-meltable" if the polymer stabilizer has its "major melting point" below the temperature at which the polyacetal is melt processed but it does not undergo significant melt flow at that temperature. The melt flow rate of the non-meltable polymer stabilizer may not be significant because the non-meltable polymer stabilizer has a high viscosity, attributed to, for example, high molecular weight or crosslinking. In the case where the non-meltable polymer stabilizer has its "major melting point" below the temperature at which the polyacetal is melt processed, the melt flow rate of the non-meltable polymer stabilizer, as measured in accordance with ASTM-D 1238, is preferably less than one-tenth that of the polyacetal. The "major melting point" of the non-meltable polymer stabilizer can be determined on a differential scanning calorimeter. "Major melting point" is the temperature at which the amount of heat absorbed, by the polymer stabilizer, is greatest; i.e., it is the temperature at which the non-meltable polymer stabilizer shows the greatest endotherm.

As an example of how to measure melt flow rate, and in accordance with ASTM-D 1238, the melt flow rate should be measured at 200° C. under a load of 2.16 kilograms. The non-meltable polymer stabilizer should be dried at 90° C. for 12 hours prior to measuring the melt flow rate. The non-meltable polymer stabilizer should be loaded into the melt indexer and the indexer should be kept plugged for 6 minutes while the stabilizer polymer is heated to test temperature. After 6 minutes, the plug is released and the melt flow rate is determined over three minutes intervals. The technique for measuring melt flow rate is further disclosed below, after the disclosure relating to the preparation of the non-meltable polymer stabilizer.

The melting point of the non-meltable polymer stabilizer can, for example, be determined on a DUPONT Model 9900 DIFFERENTIAL SCANNING CALORIMETER (DSC) in a nitrogen atmosphere. To eliminate the possible effect of small amounts of moisture or solvents, each non-meltable polymer stabilizer should be first heated to about 140° C. and held there for about 10 minutes. The samples should then be cooled to about 25° C. and then heated at a rate of 20° C./minute up to 350° C. On this particular DSC, the temperature at which endotherms occur will be given. Also, the amount of heat absorbed, in Joules/gram, at each respective endotherm will be given. The major melting point is the temperature at which the greatest amount of heat, in Joules/gram, is absorbed.

Polyacetals are usually melt processed at melt temperatures of about 170–260° C., preferably 185–240° C., most preferably 200–230° C. The polymer stabilizer should be non-meltable at the particular temperature at which the polyacetal is melt processed.

The non-meltable polymer stabilizer must also have a number average particle size of less than 10 microns after melt processing with the polyacetal. It further should have a number average particle size of less than 10 microns before melt processing with the polyacetal. It should be understood that a high degree of loose agglomeration of particles in the non-meltable polymer stabilizer may occur during the preparation and isolation of the non-meltable polymer stabilizer, such as, for example, during the drying of the non-meltable polymer stabilizer. In order for one to obtain a true and accurate measurement of the number average particle size, prior to melt processing, for a non-meltable polymer stabilizer containing a high degree of loose agglomerates, the loose agglomerates should be broken up prior to measuring the number average particle size of the non-meltable polymer stabilizer or, alternatively, they should be discounted in making said measurement. Whether or not a non-meltable polymer stabilizer contains a high degree of loose agglomerates can be determined by standard techniques of transmission electron microscopy. The details of determining the number average particle size, both before and after melt processing, are disclosed below.

The formaldehyde reactive hydroxyl groups can be incorporated into the non-meltable polymer stabilizer by using an appropriate hydroxyl containing monomer, such as, for example, hydroxyl alkyl acrylates or methacrylates. Alternatively, the formaldehyde reactive hydroxyl groups can be generated on the non-meltable polymer stabilizer by transforming another group into a hydroxyl group, such as, for example, by hydrolysis of esters or epoxides, or by reduction of carbonyl groups. Regardless of the methods by which the formaldehyde reactive hydroxyl groups are incorporated, the polymer stabilizer prepared therefrom must be non-meltable, or capable of being made non-meltable, at the temperature at which the polyacetal is melt processed.

Similarly, the formaldehyde reactive nitrogen groups can be incorporated into the non-meltable polymer stabilizer by using an appropriate nitrogen containing monomer, such as, for example, acrylamide and methacrylamide. Preferred nitrogen containing monomers are those that result in the non-meltable polymer stabilizer containing formaldehyde reactive nitrogen groups, wherein there are two hydrogen atoms attached to the nitrogen. The particularly preferred monomer is acrylamide which, when polymerized, results in a non-meltable polymer stabilizer having substantially all of the formaldehyde reactive nitrogen groups attached directly as a side chain of the polymer backbone or indirectly as a side chain of the polymer backbone. Alternatively, the formaldehyde reactive nitrogen groups can be generated on the non-meltable polymer stabilizer by modification of the polymer or copolymer. The formaldehyde reactive nitrogen groups may be incorporated by either method as long as the resultant polymer prepared therefrom is non-meltable, or is capable of being made non-meltable, at the temperature at which the polyacetal is melt processed.

The quantity of the formaldehyde reactive hydroxyl or nitrogen groups in the non-meltable polymer stabilizer must be such that the atoms in the backbone to which the formaldehyde reactive groups are attached, either directly or indirectly, are separated from each other (i.e., connected to each other) by not more than twenty chain atoms. Preferably, the non-meltable polymer stabilizer will contain at least one formaldehyde reactive hydroxyl or nitrogen group per each twenty carbon atoms in the backbone of the polymer. More preferably, the ratio of formaldehyde reactive hydroxyl or nitrogen groups to carbon atoms in the backbone will be 1:2–1:10, most preferably 25 1:2–1:5.

The formaldehyde reactive nitrogen groups should be present in the non-meltable polymer stabilizer such that the amount of the formaldehyde reactive nitrogen groups as, or part of, the side chains of the non-meltable polymer stabilizer backbone is at least 3 times, preferably at least ten times, the amount of the formaldehyde reactive nitrogen groups, if any, present in the backbone of the polymer stabilizer. In other words, the formaldehyde reactive nitrogen groups, attached directly or indirectly to the atoms in the backbone of the non-meltable stabilizer polymer, should be at least three times as great, preferably at least ten times as great, as those in the backbone of the non-meltable polymer stabilizer, if such are present. The formaldehyde reactive nitrogen groups attached directly or indirectly to the side of the polymer backbone are preferably present in a substantially greater quantity than the formaldehyde reactive nitrogen groups, if any, present in the polymer backbone. Most preferably, nearly one hundred percent of the formaldehyde reactive nitrogen groups are attached to the sides of the polymer backbone.

The polymer stabilizer can be a homopolymer or a copolymer, provided it is non-meltable. It is preferred that the non-meltable polymer stabilizer be polymerized from acrylamide or methacrylamide monomer by free radical polymerization and that the polymer stabilizer prepared therefrom consist of at least 75 mole percent of a unit of the form

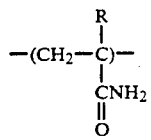

where R=hydrogen or methyl. More preferably, it consists of at least 90 mole percent of the above units, even more preferably, it consists of at least 95 mole percent of the above units, and most preferably, it consists of at least 99 mole percent of the above unit.

The non-meltable polymer stabilizer may be a copolymer in that it is polymerized from more than one monomer. The comonomer may or may not contain formaldehyde reactive nitrogen and/or formaldehyde reactive hydroxyl groups. Examples of other monomers that may be thus incorporated include styrene, ethylene, alkyl acrylates, alkyl methacrylates, N-vinylpyrrolidone, and acrylonitrile. The polymer stabilizer that is a copolymer must still be non-meltable. It further must possess the required quantity of formaldehyde reactive hydroxyl and/or nitrogen groups, in the required ratio, and it must have the required number average particle size. The comonomer preferably should be added such that it does not unduly minimize the number of moles of formaldehyde reactive groups per gram of polymer stabilizer. Further, it should not unduly minimize the number of formaldehyde reactive sites per gram of polymer stabilizer.

Specific preferred non-meltable polymer stabilizers that are copolymeric include copolymers of hydroxypropyl methacrylate with acrylamide, methacrylamide, or dimethylaminoethyl methacrylate.

When the non-meltable polymer stabilizer has a high number of formaldehyde reactive hydroxyl groups in comparison to the number of formaldehyde reactive nitrogen groups or, alternatively, when it has only formaldehyde reactive hydroxyl groups, it may be advantageous to include other groups in the stabilizer that are basic. This is because for optimum performance as a stabilizer for polyacetal, the stabilizer should be reactive with both formaldehyde and acid. Preferably, these other groups are nitrogen containing groups, such as amines, amides, ureas, and urethanes.

The non-meltable polymer stabilizer must have a number average particle size of less than 10 microns, preferably less than 5 microns, and most preferably less than 2 microns, as measured before processing in polyacetal. Along with the polymer stabilizer being non-meltable, the number average particle size of the polymer stabilizer is important in achieving the improved stability for polyacetal demonstrated herein. If the non-meltable polymer stabilizer particle size is, on average, too large, then the interaction between the polyacetal and the polymer stabilizer can be negligible and the non-meltable polymer stabilizer may have greatly reduced effectiveness. Stability is related to the interaction that occurs between the polyacetal and the non-meltable polymer stabilizer and as such, it is desirable to have good interaction between the polyacetal and the non-meltable polymer stabilizer. Maximizing the surface area/gram of non-meltable polymer stabilizer increases interaction between the non-meltable polymer stabilizer and the polyacetal. The surface area/gram of non-meltable polymer stabilizer increases as the particle size of the non-meltable polymer stabilizer decreases. Thus, a stabilizer with small particle size is highly desired.

If the non-meltable polymer stabilizer particle size is, on average, on the order of 10-100 microns, then the non-meltable stabilizer may impart stability to the polyacetal but the physical properties of the articles manufactured from the polyacetal may be reduced. Relatively large particles may also cause uneven surface in the articles manufactured from polyacetal containing non-meltable polymer stabilizer with large particles. In some cases, it may however be desirable to produce articles with surfaces having reduced surface gloss. In that case, a non-meltable polymer stabilizer of large particle size, more near the upper limit of the number average particle size, may actually be preferred.

The small number average particle size of the non-meltable polymer stabilizer may be obtained directly during the polymerization of the monomer or comonomers. To obtain the small average particle size, the non-meltable polymer stabilizer polymerization is carried out by conventional dispersion polymerization methods in an organic media or by conventional emulsion polymerization methods in water, the techniques of each of which are well known in the art. Whether the polymerization technique is dispersion polymerization or emulsion polymerization, the polymer stabilizer prepared therefrom should be insoluble in the polymerization media. Thus, the particular media selected for polymerization is dependent upon the particular monomer or comonomers chosen and the polymer that will result therefrom. For example, where acrylamide or methacrylamide is a monomer for polymerization, the preferred media is a lower alkyl alcohol. The polymerization may be by addition or condensation polymerization or free radical polymerization. The most preferred method is one that will result in the number of formaldehyde reactive sites in the formaldehyde reactive group being maximized. Generally, free radical polymerization is the preferred method of polymerization. Non-meltable polymer stabilizer prepared from acrylamide is most preferably prepared by free radical polymerization. In any event, the polymerization method must be such that it results in a polymer stabilizer having formaldehyde reactive nitrogen groups or formaldehyde reactive hydroxyl groups in the quantities and amounts previously defined.

In some cases, the non-meltable polymer stabilizer produced by the polymerization to small particle size will have a sufficient major melting point or have a sufficiently low melt flow rate such that it is non-meltable as polymerized. In other cases, the polymer stabilizer may not be non-meltable as polymerized but, prior to or during the melt processing in polyacetal, it will crosslink, due to, for example, application of heat, to a sufficiently high molecular weight such that it has a low melt flow rate and is non-meltable at the temperature at which the polyacetal is melt processed. Whether the polymer stabilizer will be non-meltable as polymerized or will become non-meltable after polymerization depends upon the nature of the particular monomer or comonomers being polymerized.

In some cases, the polymer stabilizer produced by the polymerization of the monomer or comonomers will not be non-meltable as polymerized and it will not become non-meltable subsequent to polymerization. This can be easily determined by measuring the melting point or melt flow rate of the stabilizer after it has been compounded with polyacetal. In such cases, it is desirable to include at least one monomer that crosslinks the polymer stabilizer either during polymerization or at a later time. Monomers that will cause crosslinking during polymerization include polyfunctional, unsaturated monomers, such as, for example, acrylates, methacrylates, acrylamides, and methacrylamides, and derivatives thereof. Specifically preferred monomers are ethylene glycol dimethacrylate, 1,4-butanediol diacrylate and N,N'-methylenebisacrylamide. Monomers that may cause crosslinking after polymerization of the stabilizer polymer is complete include, for example, glycidyl methacrylate, acrylic acid, methacrylic acid, and derivatives thereof. The crosslinking monomer should be added in an amount that is sufficient to yield a polymer stabilizer that is non-meltable at the temperature at which the polyacetal is melt processed.

During the polymerization to small particle size in an organic media, with or without a crosslinking monomer, it can be advantageous to have a dispersing aid present. During the polymerization to small particle size in an emulsion, it can be advantageous to have an emulsifier present. Dispersing aids and the methods of preparing them are well known in the art. A description of the methods of making and choosing dispersing aids is included in *Dispersion Polymerization in Organic Media* (by K. E. J. Barrett, New York: John Wiley & Sons, 1975). Particularly preferred dispersing aids include polyethylene glycol and its derivatives, methyl methacrylate copolymers, and poly(oxypropylene)-poly(oxyethylene) glycol block copolymers. Emulsifiers and the method of preparing them are well known in the art. Emulsion polymerizations are discussed in *Emulsion Polymerization Theory and Practice* (by D. C. Blackley, New York: John Wiley & Sons, 1975).

The dispersant or dispersant solution or the emulsifier is added to the polymerization reaction vessel simultaneously with the monomer and polymerization medium, and, where applicable, comonomer and crosslinking monomer. When a dispersant or dispersant solution or emulsifier is added to the stabilizer, it is advantageous remove the dispersant or dispersant solution or emulsifier from the stabilizer polymer by washing the stabilizer polymer, after it is prepared, with a solvent in which the dispersant solution or dispersant or emulsifier is soluble but in which the polymer stabilizer is insoluble. This is particularly true if the dispersant or dispersant solution or emulsifier is known to destabilize polyacetal. If the dispersant or dispersant solution or emulsifier is not known to destabilize polyacetal, it may be advantageous to leave it in the stabilizer polymer as it can act to reduce any agglomeration of particles that may occur during the drying of the polymer stabilizer.

Further, regarding the measurement of the melt flow rate, it is known that water and other liquids or low molecular weight solids have substantial effects on melt flow. Depending upon the technique used to isolate the non-meltable polymer stabilizers, dispersant, when used, may be retained with the stabilizer polymer. Prior to measuring the melt flow rate, the dispersant should be removed by washing the non-meltable polymer stabilizer with a liquid that is a solvent for the dispersant and is a non-solvent for the non-meltable polymer stabilizer. After washing, the non-meltable polymer stabilizer should be redried prior to testing.

The small number average particle size of the non-meltable polymer stabilizer may alternatively be obtained subsequent to the polymerization of the monomer or comonomers, while the non-meltable polymer stabilizer is still in the polymerization medium or is in solution. In such cases, the small number average particle size of the non-meltable polymer stabilizer may be obtained by adding a crosslinking monomer to the polymer stabilizer in the polymerization medium, after which the stabilizer polymer becomes insoluble in the medium. Alternatively, the small number average particle size of the non-meltable polymer stabilizer may be obtained by adding a solvent in which the non-meltable polymer stabilizer is insoluble to the non-meltable polymer stabilizer in the polymerization medium. Similarly, the non-meltable polymer stabilizer in the polymerization medium may be added to a solvent in which the polymer stabilizer is insoluble. Small number average particle size can be obtained by other known means of separating the polymer from the polymerization medium. It can be advantageous to use dispersing aids or emulsifiers such as those previously described to separate the non-meltable stabilizer polymer from the polymerization medium.

Any method may be used to prepare the polymer stabilizer provided that such method will yield a polymer stabilizer having small particles, with a number average size less than 10 microns, prior to melt processing with polyacetal. Further, the small particles should be non-meltable at the temperature at which the polyacetal is melt processed and should not coalesce or agglomerate to such an extent that they are not readily dispersible in the polyacetal melt.

The number average particle size of the non-meltable polymer stabilizer before it is melt processed with polyacetal can be measured by any means capable of determining number average particle size. The preferred means is the MICROTRAC II SMALL PARTICLE ANALYZER (ANALYZER), manufactured by Leeds & Northrup. By this method, the polymer stabilizer is added to a liquid, such as, for example, 2-propanol, and shaken by hand to disperse the polymer stabilizer in the liquid. In some cases, a high concentration of loose agglomerates may have occurred during the preparation of the polymer stabilizer. In such cases, more intensive mixing may be desired in order to break up the loose agglomerates. An example of a device capable of providing such intensive mixing is a "POLYTRON" (sold by Brinckman Instruments). From this dispersion of non-meltable polymer stabilizer in liquid, the number average particle size for the polymer stabilizer is determined by the ANALYZER.

A specific example of the ANALYZER is the Model 158705/158708, which is equipped with a 17 channel detector system that covers a particle size range of 0.17 to 60 microns. The ANALYZER works by printing the percent of particle volume that have a diameter of less than the given detector channel. From the diameter and particle volume, the number average particle size is calculated. In this calculation, the particle diameter for a given detector channel is approximated by the channel diameter. The number of particles in each channel is calculated by the following formula:

$$N = (10000 \ V\%)/(0.5236 \ d^3/6)$$

where
  $N$ = number of particles in a given channel
  $V\%$ = volume of particles in that channel
  $d$ = channel diameter By summing the number of particles in all 17 channels, the total number of particles is calculated. By multiplying the number of particles in a channel by 100, and dividing the result by the total number of particles, the percent of particles in each channel is calculated. To calculate the total number percent having a diameter of less than that channel, starting with the smallest diameter channel, a cumulative number percent is calculated by adding the number percent in all channels that have a diameter less than or equal to that particular channel. From this cumulative sum of number percents, the median number average particle size is calculated.

The number average particle size of the stabilizer after it has been melt processed with polyacetal should be less than 10 microns, preferably less than 5 microns, and most preferably less than 2 microns. It can be measured by any technique capable of measuring number average particle size for particles in a polymer. The preferred method of measuring the number average particle size of the stabilizer in the polyacetal is by transmission electron microscopy.

For example, particle size can be determined from a pellet of the compounded polyacetal composition by sectioning the pellet with a Reichert-Jung Ultracut E model FC4E diamond knife microtome. Using standard $-90°$ C. cryo-ultramicrotomy techniques, 90–120 nanometer sections of each sample are microtomed. The microtomed sections, still on the diamond blade, are picked off the diamond blade and mounted directly onto a copper transmission electron microscopy (TEM) grid. The sections, as mounted, are placed in a Denton vacuum evaporator model D V-502 and, under high vacuum, coated with a thin layer of spectroscopically pure carbon less than 20 nanometers thick. The carbon coating gives acetal sections more stability when exposed to the electron beam inside the transmission electron microscope. The carbon coated sections on the TEM grids are then examined using a Zeiss EM10CR transmission electron microscope. Images are recorded at nominal magnifications of 1000x, 2520x, and 5000x on 70 mm (Kodak 5302), and printed. Magnification calibrations performed on an annual basis using a commercially available grating replica are combined with the photographic enlargement factor to give the final image magnification, which includes 4640x, 11800x, and 23000x. The number average particle size is determined from the recorded images by measuring, with a ruler, the diameter of at least 50 particles, including large particles and any particles that may have agglomerated. Agglomerated particles are treated as one particle. The number average particle size is calculated by averaging the values obtained from the at least 50 particles.

The meltable co-stabilizer

The term "co-stabilizer" as used herein means any compound that is a meltable thermal stabilizer for polyacetal. By the term "meltable", it is meant that the co-stabilizer has a melting point or glass transition temperature less than the temperature at which the polyacetal is melt processed or alternatively, it is meant that the co-stabilizer has a melt flow rate greater than one-tenth that of the polyacetal at the temperature at which the polyacetal is melt processed. The melting point and glass transition temperature can be determined by DSC analysis, as described previously. The melt flow rate can also be determined as previously described.

Meltable thermal stabilizers for polyacetal are well known in the art. Examples of such meltable thermal stabilizers for polyacetal include, but are not limited to, polyamides, amide-containing compounds, urethanes, ureas, amine-containing compounds, and hydroxy-containing compounds. It is important to note that highly basic compounds may have a de-stabilizing effect on polyacetal homopolymer and therefore, any such compound should be purified or reduced in basicity to the appropriate levels prior to incorporating it into the polyacetal homopolymer composition. This is discussed in further detail below.

Polyamides are well known in the art. The use of a polyamide as a thermal stabilizer for polyacetal, along with the method for preparing such polyamides, is disclosed in the following patents, each of which is incorporated herein by reference: U.S. Pat. No. 2,993,025; U.S. Pat. No. 2,966,467; U.S. Pat. No. 3,001,966; U.S. Pat. No. 3,235,624; U.S. Pat. No. 3,288,885; U.S. Pat. No. 3,103,499; U.S. Pat. No. 4,744,934; U.S. Pat. No. 3,960,984; U.S. Pat. No. 4,098,843; and U.S. Pat. No. 3,116,267. The preferred polyamide is a 33/23/43 weight percent terpolymer of nylon 66, nylon 6/10, and nylon 6, respectively.

Amide-containing compounds are well known in the art. The use of an amide-containing compound as a thermal stabilizer for polyacetal, along with the method for preparing such a compound, is disclosed in the following patents, each of which is incorporated herein by reference: U.S. Pat. No. 3,574,786; U.S. Pat. No. 3,592,873; U.S. Pat. No. 3,355,514; U.S. Pat. No. 3,787,353; and U.S. Pat. No. 3,156,669.

Urethanes and ureas are well known in the art. Their use as a polyacetal thermal stabilizer, along with the method of making the urethane or urea, is disclosed in the following patents, each of which is incorporated herein by reference: U.S. Pat. No. 4,780,498; U.S. Pat. No. 2,893,972; and U.S. Pat. No. 3,144,431.

Amine-containing compounds are well known in the art. The use of amine-containing compounds as polyacetal thermal stabilizers, along with the method for preparing said compound, is disclosed in the following patents, each of which is incorporated herein by reference: U.S. Pat. No. 3,133,896; U.S. Pat. No. 2,920,059; U.S. Pat. No. 2,376,354; U.S. Pat. No. 2,810,708; U.S. Pat. No. 4,751,272; U.S. Pat. No. 3,406,222; U.S. Pat. No. 3,249,582; U.S. Pat. No. 3,448,169; and U.S. Pat. No. 3,442,850.

Hydroxy-containing materials are well known in the art. The use of such materials, along with the method for preparing such materials, is disclosed in the following patents, each of which is incorporated herein by reference: U.S. Pat. No. 4,766,168; U.S. Pat. No. 2,936,298; U.S. Pat. No. 2,966,476; U.S. Pat. No. 2,376,354; U.S. Pat. No. 3,219,621; U.S. Pat. No. 4,555,357; U.S. Pat. No. 3,240,753; and U.S. Pat. No. 3,459,789. The preferred hydroxy-containing compound is that which is disclosed in U.S. Pat. No. 4,766,168. Specifically, the hydroxy containing compound disclosed in U.S. Pat. No. 4,766,168 is a hydroxy containing polymer or oligomer wherein the atoms in the backbone of the polymer or oligomer to which the hydroxy groups are attached, directly or indirectly, are separated from each other, on average, by not more than twenty chain atoms and wherein the hydroxy containing polymer or oligomer is substantially free of acidic materials. Specific hydroxy-containing compounds disclosed in U.S. Pat. No. 4,766,168 include poly(vinyl alcohol), poly(ethylene vinyl alcohol), hydroxyesters of poly(meth)acrylates, such as poly(hydroxypropyl methacrylate), and vinyl alcohol/methylmethacrylate copolymers. The preferred hydroxy-containing compound for the compositions of the present invention is poly(ethylene vinyl alcohol).

The meltable co-stabilizer may be a single compound or it may be a mixture of more than one meltable co-stabilizer. The preferred co-stabilizer for the non-meltable polymer stabilized polyacetal compositions of the present invention is either a 33/23/43 weight percent terpolymer of nylon 66, nylon 6/10, and nylon 6, respectively or the hydroxy-containing polymer described in U.S. Pat. No. 4,766,168. If the co-stabilizer is added as a mixture, it is preferred that it be a 1:1–1:5 mixture of the 33/23/43 weight percent terpolymer of nylon 66, nylon 6/10, and nylon 6, respectively with the hydroxy-containing polymer described in U.S. Pat. No. 4,766,168.

The primary antioxidant

The at least one primary antioxidant used in the compositions of the present invention is known in the art. Primary antioxidants are also referred to in the art as chain terminating antioxidants or radical scavengers. The majority of primary antioxidants are sterically hindered phenols or secondary aromatic amines. It is preferred that the primary antioxidant used in the compositions of the present invention be of the sterically hindered phenol type.

Sterically hindered phenolic antioxidants that can be used in the compositions of the present invention include, but are not limited to, the following:

Simple antioxidants, such as 2,6-dialkylphenols, including, for example, 2,6-di-tert-butyl-4-methylphenol, 2-tert-butyl-4,6-dimethylphenol, 2,6-di-tert-butyl-4-methoxymethylphenol and 2,6-di-octadecyl-4-methyl phenol.

Derivatives of alkylated hydroquinones, such as for example, 2,5-di-tert-butyl-hydroquinone, 2,5-di-tert-amylhydroquinone, 2,6-di-tert-butylhydroquinone, 2,6-di-tert-butyl-4-hydroxy-anisole, 3,5-di-tert-butyl-4-hydroxy-anisole, 3,5-di-tert-butyl-4-hydroxyphenyl stearate, and bis(3,5-di-tert-butyl-4-hydroxyphenyl) adipate.

Alkylidene-bisphenols, such as, for example, 2,2'-methylene-bis-(6-tert-butyl-4-methylphenol), 2,2'-methylene-bis-(6-tert-butyl-4-ethylphenol), 4,4'-methylene-bis-(6-tert-butyl-2-methylphenol), 4,4'-methylene-bis-(2,6-tert-butyl-phenol), 2,6-di-tert-butyl-5-methyl-2-hydroxybenzyl)4-methylphenol, 2,2'-methylene-bis-[4-methyl-6-(4-methylcyclohexyl)-phenol], 1,1-bis-(3,5-dimethyl-2-hydroxyphenyl)-butene, 1,1-bis-(4-tert-butyl-4-hydroxy-2-methylphenyl)-butane, 2,2-bis-(3,5- di-tert-butyl-4-hydroxyphenyl)-propane, 1,1,3-tris-(5-tert-butyl-4-hydroxy-2-methylphenyl)-butane, 2,2-bis-(5-tert-butyl-4-hydroxy-2-methylphenyl)-4-n-dodecylmercaptobutane, 1,1,5,5-tert-butyl-4-hydroxy-2methylphenyl)-pentane and ethylene glycol bis [3,3-bis-(3'-tert-butyl-4'-hydroxyphenyl)-butyrate].

O- and N-benzyl compounds, such as, for example, 3,3,5,5'-tetra-tert-butyl-4,4'-dihydroxydibenzyl ether, and tris-(3,5-di-tert-butyl-4-hydroxybenzyl)-amine.

Hydroxybenzylated malonates, such as, for example, dioctadecyl 2,2-bis-(3,5-di-tert-butyl-2-hydroxybenzyl)-malonate, dioctadecyl 2-(3-tert-butyl-4-hydroxy-5-methylbenzyl)-malonate, and di-[4-(1,1,3,3-tetra- methylbutyl)-phenyl] 2,2-bis-(3,5-di-tert-butyl-4- hydroxybenzyl)-malonate.

Hydroxybenzyl-aromatic compounds, such as, for example, 1,3,5-tris-(3,5-di-tert-butyl-4-hydroxybenzyl)-2,4,6-trimethylbenzene, 1,4-bis-(3,5-di-tert-butyl-4-hydroxybenzyl)-2,3,5,6-tetramethylbenzene and 2,4,6-tri-(3,5-di-tert-butyl-4-hydroxybenzyl)-phenol.

s-Triazine compounds, such as, for example, 2,4,6-tris-(3,5-di-tert-butyl-4-hydroxyphenoxy)-s-triazine, 2,4,6-tris-(3,5-di-tert-butyl-4-hydroxyphenylethyl)-s-triazine and 1,3,5-tris-(3,5-di-tert-butyl-4-hydroxybenzyl)isocyanurate.

Amides of beta-(3,5-di-tert-butyl-4-hydroxyphenyl) propionic acid, such as, for example, 1,3,5-tris-3,5-di-tert-butyl-4-hydroxyphenylpropionyl)-hexahydro-s-triazine and N,N'-hexamethylene bis(3,5-di-tert-butyl-4-hydroxyhydrocinnamide); amide-containing phenolic antioxidants such as N,N'-bis-beta-(3,5-di-tert-butyl-4-hydroxyphenylpropionyl)-hydrazine and 2,2'-oxalyldiamidobisethyl-3-(3,5-di-tert-butyl-4-hydroxyphenyl) propionate.

Esters of beta-(3,5-di-tert-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol diethylene glycol, triethylene glycol, neopentylglycol, pentaerythritol, trimethylhexanediol, trimethylolethane, triethylolpropane, and trishydroxyethyl isocyanurate.

Esters of beta(5-tert-butyl-4-hydroxy-3-methylphenyl)propionic acid with monohydric or polyhydric alcohols, such as for example, with methanol, ethanol, octadecanol, 1,6-hexanediol, 1,9-nonanediol, ethylene glycol, 1,2-propanediol, diethylene glycol, triethylene glycol, neopentylglycol, pentaerythritol, trimethylhexane-diol, trimethylolethane, trimethylolpropane, and tris-hydroxyethyl isocyanurate.

Esters of 3,5-di-tert-butyl-4-hydroxyphenylacetic acid with monohydric or polyhydric alcohols, such as, for example, with methanol, ethanol, octadecanol, 1,6-hexanediol, 1,9-nonanediol, ethylene glycol, 1,2-propanediol, diethylene glycol, neopentylglycol, pentaerythritol, trimethylhexanediol, trimethylolethane, trimethylol-propane, and tris-hydroxyethyl isocyanurate.

The preferred sterically hindered phenolic antioxidants are amides of beta-(3,5-di-tert-butyl-4-hydroxyphenyl) propionic acid, such as, for example, 1,3,5-tris-3,5-di-tert-butyl-4-hydroxyphenylpropionyl)-hexahydro-s-triazine and N,N'-hexamethylene bis(3,5-di-tert-butyl-4-hydroxyhydrocinnamide); 2,2'-oxalyldiamidobisethyl-3-(3,5-di-tert-butyl-4-hydroxyphenyl) propionate; triethylene glycol bis(3-3'-tert-butyl-4'-hydroxy-5'-methyl(phenyl) proprionate); and tetrakis(-methylene (3,5-di-tert-butyl-4-hydroxyhydrocinnamate)) methane. The most preferred antioxidant is N,N'-hexamethylene bis(3,5-di-tert-butyl-4-hydroxyhydrocinnamide).

Examples of secondary aromatic amine antioxidants that can be used in the compositions of the present invention include the following: diarylamines, such as N-phenyl-alpha-naphthylamine, p-oriented styrenated diphenylamine, octylated diphenylamines, and 4,4'-bis-(alpha, alpha-dimethylbenzyl)-diphenylamine; and p-phenylenediamines, such as N,N'-diphenyl-p-phenylenediamine and N,N'-di-beta-naphthyl-p-phenylenediamine.

The primary antioxidant may be added as one single primary antioxidant or it may be added as a mixture of more than one primary antioxidant. Preferably, the mixture is comprised only of sterically hindered phenolic type primary antioxidants. Regardless of whether the primary antioxidant is added alone or as a mixture, the total weight percent of primary antioxidant in the polyacetal composition must range from 0.02–1.0 weight percent, said weight percent being based upon the weight of the non-meltable polymer stabilizer, the primary antioxidant(s), the co-stabilizer, and the polyacetal.

The composition

The compositions of the present invention consist essentially of 0.05–3.0 weight percent of the at least one non-meltable polymer stabilizer, 0.01–1.00 weight percent of the at least one co-stabilizer, 0.02–1.0 weight percent of the at least one primary antioxidant, and 95–99.9 weight percent of the polyacetal. The preferred compositions consists essentially of 0.15–1.5 weight percent of the at least one non-meltable polymer stabilizer, 0.01–0.50 weight percent of the at least one co-stabilizer, 0.02–0.50 weight percent of the at least one phenolic antioxidant, and 97.5–99.8 weight percent of polyacetal. The most preferred composition consists essentially of 0.2–1.0 weight percent of the at least one non-meltable polymer stabilizer, 0.05–0.30 weight percent of the at least one co-stabilizer, 0.05–0.25 weight percent of the at least one phenolic antioxidant, and 98.4–99.7 weight percent of the polyacetal. All the above weight percents are based upon the weight of the non-meltable polymer stabilizer, the co-stabilizer, the primary antioxidant, and the polyacetal.

It should be understood that the compositions of the present invention can, in addition to the polyacetal, the non-meltable polymer, the co-stabilizer, and the primary antioxidant, include other ingredients, modifiers, and additives as are generally used in polyacetal molding resins, including pigments, colorants, UV stabilizers, toughening agents, nucleating agents, and fillers. It should also be understood that some pigments, colorants, and/or other additives can, themselves, adversely affect the stability of polyacetal compositions.

Examples of such other ingredients, modifiers, and additives include the following:

UV-Absorbers and light stabilizing agents include the following:

2-(2'-hydroxyphenyl)-benzotriazoles, e.g., the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl,5'-tert-butyl,3'-alpha-methylbenzyl-5'-methyl-, 3'-alpha-methylbenzyl-5'-methyl-5-chloro-, 4'-hydroxy-, 4'-methoxy-, 4'-octoxy-, 3',5'-di-tert-amyl-, 3'-methyl-5'-carbomethoxyethyl-, 3',5'-bis (alpha, alpha-dimethylbenzyl), 3',5'-bis-(alpha, alpha-dimethylbenzyl)-5-chloro, 3',5'-di-tertoctylphenyl, 3',5'-di-tert-octylphenyl-5-chloro-, and 5-chloro-3',5'-di-tert-amyl-derivatives; 2,4-bis (2'-hydroxyphenyl)-6-alkyl-s-triazines, e.g., the 6-ethyl-, 6-heptadecyl-, or 6-undecyl-derivative. 2-hydroxybenzophenones, e.g., the 4-hydroxy-, 4-methoxy-, 4-octoxy-, 4-decyloxy-, 4-dodecyloxy-, 4-benzyloxy-, 2',4-4'-trihydroxy- or 2'-hydroxy4,4'-dimethoxy-derivative; 1,3-bis(2'-hydroxybenzoyl)benzenes, e.g. 1,3-bis-(2'-hydroxy-4'-hexloxy-benzoyl)-benzene, 1,3-bis(2'-hydroxy-4'-octyloxybenzoyl)-benzene or 1,3-bis(2'-hydroxy-4'-dodecyloxybenzoyl)-benzene; Esters of optionally substituted benzoic acids, e.g., phenylisalicylate, octylphenylsalicylate, dibenzoylresorcia, bis-(4-tert-butylbenzoyl)-resorcia, benzoylresorcia, 3,5-di-tert-butyl-4-hydroxybenzoic acid-2,4-di-tert-butylphenyl ester or -octadecyl ester or n-hexadecyl ester or -2-methyl-4,6-di-tert-butyl ester; Acrylates, e.g., alpha-cyano-beta-beta-diphenylacrylic acid-ethyl ester or iso-octyl ester, alpha-carbomethoxy-cinnamic acid methyl ester, alpha-cyano-beta-methyl-p-methoxycinnamic acid methyl ester or butyl ester or N-(betacarbomethoxyvinyl)-2-methyl-indoline; Sterically hindered amines, e.g. 4-benzoyl-2,2,6,6-tetramethylpiperidine, 4-stearyloxy-2,2,6,6-tetramethylpiperidine, bis(2,2,6,6-tetramethyl-piperidyl)sebacate or 3-n-oxtyl-7,7,9,9-tetramethyl-1,3,8triazaspiro[4,5]decane-2,4-dione; Oxalic acid diamides, e.g., 4,4'-di-oxtyloxy-oxanilide, 2,2'-didodecyloxy-5,5'-di-tert-butyl-oxanilide, 2-ethoxy-2'-ethyl-oxanilide, N,N'-bis(3-dimethyl-aminopropyl)oxalamide, 2-ethoxy-5-tert-butyl-2'-ethyl,5,4'-ditert-butyl-oxanilide, or mixtures of ortho and paramethoxy- as well as of o- and p-ethoxy-disubstituted oxanilides.

Metal deactivators, e.g., oxanilide,isophthalic acid dihydrazide, sebacic acid-bis- phenylhydrazide, bis-benzylidene-oxalic acid dihydrazide, N,N'-diacetyl-adipic acid dihydrazide, N,N'-bis-salicyloyloxalic acid dihydrazide, N,N'-bissalicylohlhydrazine, N-salicyloyl-N'-salicylalhydrazine, or 3-salicyloyl-amino-1,2,4-triazole.

Nucleation agents, such as, for example, boron nitride and talc.

Still other additives that can be incorporated in the stabilized compositions are polytetrafluoroethylene fibers and powder; lubricants such as ethylene bis-stearamide or silicone oil; fillers, such as carbon black, asbestos, kaolin, talc, glass fibers, glass beads, glass flake, pigments, optical brighteners, and antistatic agents.

It is important that the non-meltable polymer stabilizer, the co-stabilizer, the antioxidant, and any other ingredient, modifier, or additive used in the compositions of the present invention be substantially free of compounds or impurities which destabilize acetal resins.

In stabilizing ester-capped or partially ester-capped polyacetal homopolymer, the components to be added to the polyacetal should be substantially free of basic materials which can destabilize the polyacetal. Basic impurities should preferably be removed to levels of not more than 50 ppm and most preferably to not more than 10 ppm. In stabilizing polyacetal copolymer or homopolymer that is substantially all ether-capped, higher concentrations of basic materials can be tolerated. In addition, it should be understood that if the impurity is only weakly basic relatively higher amounts can be tolerated.

In stabilizing both homopolymer and copolymer polyacetal, acidic impurities in the components of the polyacetal composition should be minimized. Acidic impurities should preferably be removed to levels of not more than 50 ppm and most preferably to not more than 10 ppm. As with basic impurities, it should be understood that if the impurity is only weakly acidic, relatively higher amounts can be tolerated.

If acidic and/or basic impurities are present in any of the components to be added to the polyacetal in amounts large enough to cause destabilization of the polyacetal composition, then the component should be purified before it is introduced into the compositions of the present invention. For example, the non-meltable polymer stabilizers used in the compositions of the present invention can be purified by washing with an appropriate liquid, such as methanol and/or water. Non-meltable polymer stabilizers prepared with dispersants or emulsifiers that have destabilizing effects because, for example, they are highly acidic or highly basic, can be purified by washing the stabilizer with a solvent in which the dispersants or emulsifiers are soluble and in which the polymer stabilizer is insoluble.

The compositions of the present invention can be prepared by mixing the non-meltable polymer stabilizer, the at least one meltable co-stabilizer, and the least one primary antioxidant with the polyacetal polymer at a temperature above the melting point of the polyacetal polymer using any intensive mixing device conventionally used in preparing thermoplastic polyacetal compositions, such as rubber mills, internal mixers such as "Banbury" and "Brabender" mixers, single or multi-blade internal mixers with a cavity heated externally or by friction, "Ko-kneaders", multibarrel mixers such as "Farrel Continuous Mixers", injection molding machines, and extruders, both single screw and twin screw, both co-rotating and counter rotating, both intermeshing and non-intermeshing. These devices can be used alone or in combination with static mixers, mixing torpedoes and/or various devices to increase internal pressure and/or the intensity of mixing, such as valves, gate or screws designed for this purpose. Extruders are preferred. Of course, such mixing should be conducted at a temperature below which significant degradation of the polyacetal will occur. The non-meltable polymer stabilizer in the composition after melt processing will have a number average particle size less than 10 microns.

Shaped articles can be made from the compositions of the present invention using any of several common methods, including compression molding, injection molding, extrusion molding, blow molding, rotational molding, melt spinning, and thermoforming. Injection molding is preferred. Examples of shaped articles include sheet, profiles, rod stock, film, filaments, fibers, strapping, tape tubing, and pipe. Such shaped articles can be post treated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170-260° C., preferably 185-240° C., most preferably 200-230° C. When injection molding the compositions of the present invention, the mold temperature will generally be 10-120° C., preferably 10-100° C., and most preferably about 50-90° C.

EXAMPLES

In the following examples, there are shown specific embodiments of the present invention and certain comparisons with embodiments of control experiments outside the limits of the present invention. It will be seen that the compositions of the present invention are characterized by improved stability. All temperatures are in degrees Celsius unless otherwise specified. Measurements not originally in SI units have been so converted and rounded where appropriate.

Preparation of Non-Meltable Polymer Stabilizers

In the following examples, total polymerization time was measured from the time at which the initiator was initially charged into the reaction vessel to the time when the polymerization was completed and heat was withdrawn from the vessel. DSC measurements were made using the DU PONT Model 9900 as previously described. The particle size of the non-meltable polymer stabilizer prior to melt compounding was measured on the ANALYZER as described previously. "PEG", where so used, is polyethylene glycol, a dispersant, having a molecular weight of about 8000.

Non-meltable polymer stabilizer A was prepared by polymerizing 298.5 grams of acrylamide, 1.5 grams of N,N'-methylenebisacrylamide, and 36 grams of PEG in 3000 ml. of 2-propanol. The polymerization reaction was started at about 72.5° C. using an initial charge of 0.15 grams of 2,2'-azobis(isobutyronitrile). Additional initiator was added, in increments of 0.03 grams, over the next approximately 200 minutes until the total amount of initiator added was 0.45 grams. Approximately 20 minutes after the initial charge of initiator was added, 91 ml. of a solution of 20 grams of PEG in 100 ml. of methanol solution were fed into the reaction vessel over a period of about 180 minutes. The polymerization temperature was maintained between about 72° and 76° C. The total polymerization time was 240 minutes. The reaction mixture was cooled to 25° C., at which point 250 ml. of 2-propanol were added. The resulting polyacrylamide stabilizer dispersion was filtered in order to isolate the polymer stabilizer. The polymer stabilizer was rinsed with 1000 ml. of 2-propanol and dried in a 60° C. vacuum oven.

DSC analysis showed that the polymer stabilizer had a small endotherm of 4.98 Joules/gram at 57.4° C., attributed to polyethylene glycol. DSC analysis further showed a second endotherm of 2.6 Joules/gram at 189.6° C. The major melting point was 291.3° C., with an endotherm of 114.5 Joules/gram. The melt flow rate, in grams/10 min., was as follows: 5.16 at 6–7 minutes, 4.12 at 7–8 minutes, and 4.03 at 8–9 minutes. The stabilizer had a number average particle size of 1.4 microns.

The polymer stabilizer was washed with hot methanol to remove the polyethylene glycol dispersant and it was then redried. DSC analysis on the washed polymer stabilizer showed a small endotherm of 2.6 Joules/gram at 187.0° C. The major melting point was 295.0° C., with an endotherm of 209.5 Joules/gram. The washed polymer stabilizer showed no flow at 6–9 minutes. This illustrates that the presence of dispersant may adversely affect melt flow rate measurements. The number average particle size was 1.4 microns.

Non-meltable polymer stabilizer B was prepared by adding a solution of 52.50 grams of acrylamide and 0.53 grams 1,4-butanediol diacrylate in methanol (78.75 grams) to a solution of 7.00 grams tert-butylperoxypivylate and 26.25 grams PEG in methanol (802.00 grams). The resulting solution was heated to reflux (approximately 64° C.). When the reaction began turning milky-white, two solutions, one consisting of 472.50 grams acrylamide and 4.72 grams 1,4-butanediol diacrylate in methanol (708.75 grams) and the other consisting of 26.25 grams PEG in methanol (172.50 grams), were simultaneously added to the refluxing reaction suspension over 2 hours. The resulting reaction suspension was allowed to reflux an additional 2.5 hours. The reaction suspension was filtered and the resulting white solid was washed with methanol (400 ml.) and dried at 55–60° C. for 6 hours.

Non-meltable polymer stabilizer C was prepared by adding a solution of 14.3 kg acrylamide and 145.15 grams of 1,4-butanediol diacrylate to a refluxing solution of 1.44 kg PEG in 48.06 kg methanol (approximately 64° C.) over about 2 hours. Throughout this addition, a total of 195.04 grams tert-butylperoxypivylate polymerization initiator was portionwise added. The resulting reaction suspension was cooled and filtered. The resulting white solid was washed with methanol and dried in a vacuum oven ($6.75 \times 10^4$ Pa) at 70° C. for 1 day and at 100° C. for 1 day.

Non-meltable polymer stabilizer D was prepared by gradually adding a solution of 201.8 grams of acrylamide, 2.04 grams of N,N'-methylenebisacrylamide, and 20.4 grams of PEG in about 3800 ml. of methanol to a refluxing solution of 8.2 grams of tertbutyl peroxypivylate polymerization initiator and 10.2 grams of PEG in about 5000 ml. of methanol. The resultant reaction mixture was allowed to stir at reflux until the reaction was complete. The resulting reaction suspension was cooled to room temperature and filtered. The resulting white solid was washed in additional methanol and dried.

Meltable co-stabilizers

The meltable co-stabilizers used in the examples below are as follows:

Co-stabilizer A was a 33/23/43 nylon terpolymer of nylon 66, nylon 6/10, and nylon 6, respectively. It had a melting point, as determined by DSC, of about 140° C. The nylon terpolymer was ground and passed through a 20 MESH screen prior to compounding. A 20 MESH screen has openings on 1.44 mm.

Co-stabilizer B was ethylene/vinyl alcohol copolymer containing 29 weight percent ethylene and 71 weight percent vinyl alcohol, and having an apparent melt viscosity at 210° C. of 9500 P, which was purified by washing at 75° C. for 16 hours using water (pH adjusted to 3 with $H_3PO_4$). The acidic water wash was drained from the washing vessel and the ethylene/vinyl alcohol copolymer was washed at 75° C. for 4 hours with demineralized water and then dried. This co-stabilizer was prepared in accordance with the teachings of U.S. Pat. No. 4,766,168. It was ground and treated in the same manner as Co-stabilizer A. It has a melting point, as determined by DSC, of about 187° C.

Co-stabilizer C was a polyurethane elastomer comprised of 37 wt% adipic acid, 39 wt% 1,4-butanediol, and 24 wt% methylene bis(4-phenyl isocyanate) having an inherent viscosity of 1.33, as measured in accordance with ASTM D-2857 (solvent: dimethylformamide (DMF); temperature: 30° C.; concentration: 0.01% co-stabilizer C in DMF). It had a melting point, as determined by DSC, of about 150° C.

Primary Antioxidants

The primary antioxidants used in the examples below are as follows:

Antioxidant A was triethylene glycol bis(3-(3'-tert-butyl-4'-hydroxy-5'-methylphenyl) proprionate).

Antioxidant B was N,N'-hexamethylene bis(3,5-di-tert-butyl-4-hydroxy-hydrocinnamide)

Antioxidant C was tetrakis(methylene (3,5-di-tert-butyl-4-hdyroxyhydrocinnamate)) methane.

Other Additives

PEG was a polyethylene glycol having a molecular weight between about 7,000-9,000 and sold commercially under the trade name of Carbowax® 8000 (Union Carbide).

PTFE was a polytetrafluoroethylene powder irradiated at the level of 7.5 mrad

Si oil was a polydimethyl siloxane, trimethylsiloxy terminated silicone oil having a viscosity of 500 centistokes and a nominal molecular weight of 17,250.

Unless otherwise specified, the polyacetal used in each example was an acetate end-capped polyoxymethylene homopolymer of about 40,000 number average molecular weight.

In the examples below, data were obtained on polyacetal compositions that had been compounded on an extruder and then molded into ⅛-inch thick tensile bars. Exact extrusion conditions are detailed below for each set of examples. The tensile bars of each composition were preweighed and were placed in a circulating air oven at 150° C. for the times noted in each Table below. Oven location effects were averaged by distributing bars of a sample throughout the oven or by continuously rotating the bars on a carousel. At the end of the specified time period, the samples were removed from the oven, weighed, and tested for tensile strength and elongation according to ASTM Method D-638 (0.2 in/min. crosshead speed). The percent weight loss was calculated from the following formula:

[1-(weight after aging)/weight before aging)]×100

PREPARATION AND EVALUATION OF POLYACETAL COMPOSITIONS OF THE PRESENT INVENTION AND CONTROL EXAMPLES

Examples 1-4 and Comparative Examples 1-4

The compositions listed in Table IA, below, were compounded on a 2-inch single screw extruder equipped with a barrier screw and a valve die (190° C. barrel temperature settings, 50-80 rpm screw speed, 500 psi pressure). The compounded resins were injection molded into ⅛-inch tensile bars on a Van Dorn Model 150 RS3 6 oz. reciprocating screw injection molding machine equipped with a two-cavity mold (45/20 injection/hold cycle, 1000 psig pressure, 200° C. barrel temperature settings, 90° C. mold temperature setting).

The tensile bars of each composition were placed in a circulating air oven at 150° C. for the times noted in Table IB, below. The reported data were averages of measurements performed on three tensile bars.

TABLE IA

| Polyacetal Compositions | | | | | |
|---|---|---|---|---|---|
|  | Wt. % Polyacetal | Non-Meltable Polymer Stabilizer | Wt. % Non-Meltable Polymer Stabilizer | Wt. % Co-Stabilizer | Wt. % Antioxidant |
| Comparative Example 1 | 99.40 | 70A:30B | 0.50 | — | 0.10A |
| Example 1 | 99.20 | 70A:30B | 0.50 | 0.20 A | 0.10A |
| Example 2 | 98.40 | 70A:30B | 0.50 | 1.00 C | 0.10A |
| Comparative Example 2 | 99.40 | 70A:30B | 0.50 | — | 0.10B |
| Comparative Example 3 | 99.10 | 70A:30B | 0.50 | — | 0.40B |
| Example 3 | 99.20 | 70A:30B | 0.50 | 0.20 A | 0.10B |
| Example 4 | 98.90 | 70A:30B | 0.50 | 0.50 B | 0.10B |
| Comparative Example 4 | 99.13 | — | — | 0.80 B | 0.07B |

TABLE IB

| Evaluation of Polyacetal Compositions in Table IA | | | | | |
|---|---|---|---|---|---|
|  | Initial | Testing at 150 Degrees C. | | | |
|  | 0 days TS/E (*/%) | 2 days TS/E/WL (*/%/%) | 5 days TS/E/WL (*/%/%) | 9 days TS/E/WL (*/%/%) | 16 days TS/E/WL (*/%/%) |
| Comparative Example 1 | 680/25 | 624/12/0.35 | 595/11/1.05 | 542/9/4.70 | 420/2/12.38 |
| Example 1 | 680/22 | 697/16/0.26 | 648/15/0.48 | 620/13/1.57 | 594/8/4.72 |
| Example 2 | 669/26 | 665/17/0.22 | 641/15/0.41 | 575/12/1.30 | 521/5/4.52 |
| Comparative Example 2 | 679/26 | 657/15/0.26 | 555/9/0.63 | 575/10/0.79 | 522/3/3.64 |
| Comparative Example 3 | 677/25 | 597/8/0.49 | 568/8/0.45 | 552/9/1.21 | 517/5/3.31 |
| Example 3 | 680/27 | 687/20/0.33 | 652/14/0.47 | 607/12/1.01 | 572/7/3.72 |
| Example 4 | 689/23 | 692/17/0.33 | 670/14/0.51 | 636/12/0.97 | 604/7/3.20 |
| Comparative Example 4 | 699/32 | 686/15/0.40 | 624/8/0.74 | 613/9/1.52 | 491/4/4.44 |

Legend
TS = tensile strength
E = elongation
WL = weight loss
*unit for tensile strength is kg/cm²

The examples show that the overall retention of properties, and thereby the long term stability, of the polyacetal compositions containing a minor amount of a co-stabilizer and a phenolic antioxidant is improved over the same compositions lacking the co-stabilizer.

Examples 5-7 and Comparative Examples 5-7

The compositions listed in Table IIA, below, were compounded on a 2-inch single screw extruder. The barrel temperature was approximately 210° C. The compounded resins were injection molded into ⅛-inch thick tensile bars with a barrel temperature of approximately 207° C. and a mold temperature of approximately 88° C.

The tensile bars of each composition were placed in a circulating air oven at 150° C. for the times noted in Table IIB, below. The reported data were the averages of measurements performed on five tensile bars.

TABLE IIA

Polyacetal Compositions Containing Mixed Co-Stabilizers

| | Wt. % Polyacetal | Non-Meltable Polymer Stabilizer | Wt. % Non-Meltable Polymer Stabilizer | Wt. % Co-Stabilizer | Wt. % Anti-oxidant |
|---|---|---|---|---|---|
| Comparative Example 5 | 99.30 | C | 0.50 | — | 0.20A |
| Example 5 | 98.95 | C | 0.50 | 0.10A 0.15B | 0.10C 0.20A |
| Comparative Example 6 | 99.35 | C | 0.50 | — | 0.05B 0.10A |
| Example 6 | 99.10 | C | 0.50 | 0.10A 0.15B | 0.05B 0.10A |
| *Comparative Example 7 | 98.85 | C | 0.50 | — | 0.05B 0.10A |
| *Example 7 | 98.60 | C | 0.50 | 0.10A 0.10B | 0.05B 0.10A |

*composition also contained 0.50 weight percent PEG

TABLE IIB

Evaluation of Polyacetal Compositions in Table IIA

| | Initial | Testing at 150 Degrees C. | | |
|---|---|---|---|---|
| | 0 days TS/E (*/%) | 10 days TS/E/WL (*/%/%) | 14 days TS/E/WL (*/%/%) | 16 days TS/E/WL (*/%/%) |
| Comparative Example 5 | 671/37 | 488/4/5.27 | 382/3/14.21 | — |
| Example 5 | 683/32 | 728/20/0.26 | — | 737/16/0.24 |
| Comparative Example 6 | 671/40 | 495/4/1.77 | 501/5/4.62 | — |
| Example 6 | 688/30 | 739/20/0.30 | — | 729/17/0.29 |
| Comparative Example 7 | 673/27 | 638/8/0.31 | — | 566/5/0.91 |

TABLE IIB-continued

Evaluation of Polyacetal Compositions in Table IIA

| | Initial | Testing at 150 Degrees C. | | |
|---|---|---|---|---|
| | 0 days TS/E (*/%) | 10 days TS/E/WL (*/%/%) | 14 days TS/E/WL (*/%/%) | 16 days TS/E/WL (*/%/%) |
| Example 7 | 673/37 | 744/24/0.27 | — | 716/14/0.40 |

Legend
TS = tensile strength
E = elongation
WL = weight loss
*unit of tensile strength is kg/cm²

The examples show that the overall long term retention of properties is greater for polyacetal compositions containing a mixed co-stabilizer and a mixed antioxidant than for those corresponding polyacetal compositions lacking the co-stabilizer component.

Examples 8-10 and Comparative Example 8

The compositions of Examples 8-10 contain additives such as PTFE and Si oil.

The compositions listed in Table IIIA, below, were compounded on a 53 mm twin screw extruder. The barrel temperature was approximately 210° C. The temperature of the melt as it exited the extruder ranged from about 210° C. to 235° C. The compounded resins were injection molded into ⅛ inch thick tensile bars on a molding machine (barrel temperature setting 207° C., mold temperature setting 88° C).

The tensile bars of each composition were placed in a circulating air oven at 130° C. for the times noted in Table IIIB, below. The reported data were the average of measurements performed on five tensile bars.

We claim:

TABLE IIIA

Polyacetal Compositions Containing Mixed Stabilizers and Additives

| | Wt. % Polyacetal | Non-Meltable Polymer Stabilizer (%) | Meltable Co-stabilizer (%) | Wt. % Antioxidant | Additive (%) |
|---|---|---|---|---|---|
| Example 8 | 96.35 | 0.50 D | 0.15 A/0.35 B | 0.075 B 0.075 A | 1.50 PTFE 1.0 Si oil |
| Example 9 | 97.35 | 0.50 D | 0.15 A/0.35 B | 0.075 B 0.075 A | 1.50 PTFE |
| Example 10 | 97.35 | 0.50 D | 0.15 A/0.35 B | 0.075 B 0.075 C | 1.50 PTFE |

TABLE IIIB

| | Evaluation of Polyacetal Compositions in Table IIIA | | |
|---|---|---|---|
| | Initial | Testing at 130 Degrees C. | |
| | 0 days TS/E (psi/%) | 10 Days TS/E/WL (psi/%/%) | 40 Days TS/E/WL (psi/%/%) |
| Example 8 | 9180/27 | 9660/14/0.28 | 8510/5.1/0.51 |
| Example 9 | 9690/20 | 10290/15/0.32 | 10260/12/0.74 |
| Example 10 | 9620/23 | 10210/16/0.40 | 9730/10/0.88 |

1. A thermoplastic polyacetal composition consisting essentially of
   (a) 0.05–3.0 weight percent of at least one non-meltable polymer selected from the group consisting of polymers containing formaldehyde reactive hydroxyl groups, polymers containing formaldehyde reactive nitrogen groups, and polymers containing both formaldehyde reactive hydroxyl groups and formaldehyde reactive nitrogen groups, provided that the atoms in the backbone of the polymer to which the formaldehyde reactive groups are attached, directly or indirectly, are separated from each other, on average, by not more than twenty chain atoms, and further provided that the amount of the formaldehyde reactive nitrogen groups attached, directly or indirectly, to the atoms which are in the backbone of the polymer is at least three times as great as the amount of formaldehyde reactive nitrogen groups present in the backbone of the polymer,
   (b) 0.01–1.00 weight percent of at least one meltable co-stabilizer selected from the group consisting of polyamides, urethanes, ureas, hydroxy-containing polymers, and hydroxy-containing oligomers,
   (c) 0.02–1.00 weight percent of at least one primary antioxidant selected from the group consisting of sterically hindered phenolic antioxidants and secondary aromatic amine antioxidants, and
   (d) 95–99.9 weight percent of at least one polyacetal polymer,
provided that the above-stated percentages are based on the total amount of components (a), (b), (c), and (d) only, further provided that the polymer of component (a) has a number average particle size in the composition of less than 10 microns, and further provided that the atoms in the backbone of the hydroxy-containing polymers and hydroxy-containing oligomers of component (b) to which the hydroxy groups are attached, directly or indirectly, are separated from each other, on average, by not more than twenty chain atoms and wherein the hydroxy-containing polymers and hydroxy-containing oligomers are substantially free of acidic materials.

2. The composition of claim 1 wherein the meltable co-stabilizer is a mixture of more than one meltable co-stabilizer.

3. The composition of claim 1 wherein the meltable co-stabilizer is polyamide.

4. The composition of claim 3 wherein the polyamide is a 33/23/43 weight percent terpolymer of nylon 66, nylon 6/10, and nylon 6, respectively.

5. The composition of claim 1 wherein the meltable co-stabilizer is a hydroxy containing polymer or oligomer wherein the atoms in the backbone of the polymer or oligomer to which the hydroxy groups are attached, directly or indirectly, are separated from each other, on average, by not more than twenty chain atoms and wherein the hydroxy containing polymer or oligomer is substantially free of acidic materials.

6. The composition of claim 5 wherein the co-stabilizer is a hydroxy-containing polymer or oligomer is selected from the group consisting of poly(vinyl alcohol), poly(ethylene vinyl alcohol), hydroxyesters of poly(meth)acrylates, and vinyl alcohol/methylmethacrylate copolymers.

7. The composition of claim 6 wherein the hydroxy-containing polymer is poly(ethylene vinyl alcohol).

8. The composition of claim 2 wherein the meltable co-stabilizer is a 1:1–1:5 polyamide:hydroxy-containing polymer mixture.

9. The composition of claim 8 wherein the polyamide is a 33/23/43 weight percent terpolymer of nylon 66, nylon 6/10, and nylon 6, respectively and the hydroxy-containing polymer is poly(ethylene vinyl alcohol).

10. The composition of claim 1 wherein the primary antioxidant is selected from amides of beta-(3,5-di-tert-butyl-4-hydroxyphenyl) propionic acid;
    2,2'-oxalyldiamidobisethyl-3-(3,5-di-tert-butyl-4-hydroxyphenyl) propionate; triethylene glycol bis(3-3'-tert-butyl-4'-hydroxy-5'-methylphenyl) propionate); and tetrakis(methylene (3,5-di-tert-butyl-4-hydroxyhydrocinnamate)) methane.

11. The composition of claim 1 wherein the primary antioxidant is N,N'-hexamethylene bis(3,5-di-tert-butyl-4-hydroxy-hydrocinnamide).

12. The composition of claim 1 wherein the primary antioxidant is a mixture of more than one primary antioxidant.

13. The composition of claim 1 wherein the non-meltable polymer stabilizer of component (a) is polyacrylamide or polymethacrylamide.

14. The composition of claim 1 wherein the non-meltable polymer stabilizer of component (a) is polyacrylamide.

15. The composition of claim 1 wherein the polyacetal is a homopolymer.

16. The composition of claim 1 wherein the polyacetal is a copolymer.

17. The composition of claim 1 further comprising at least one of pigments, colorants, reinforcing agents, UV stabilizers, nucleating agents, toughening agents, and fillers.

18. The composition of claim 1 further comprising at least one of silicone oil, polyethylene glycol, polytetrafluoroethylene fiber, and polytetrafluoroethylene powder.

19. Shaped articles made from the composition of claim 1.

* * * * *